Sept. 15, 1942. E. STRASSENBURG 2,295,812
PHOTOGRAPHIC SHUTTER
Filed Sept. 7, 1940 4 Sheets-Sheet 1
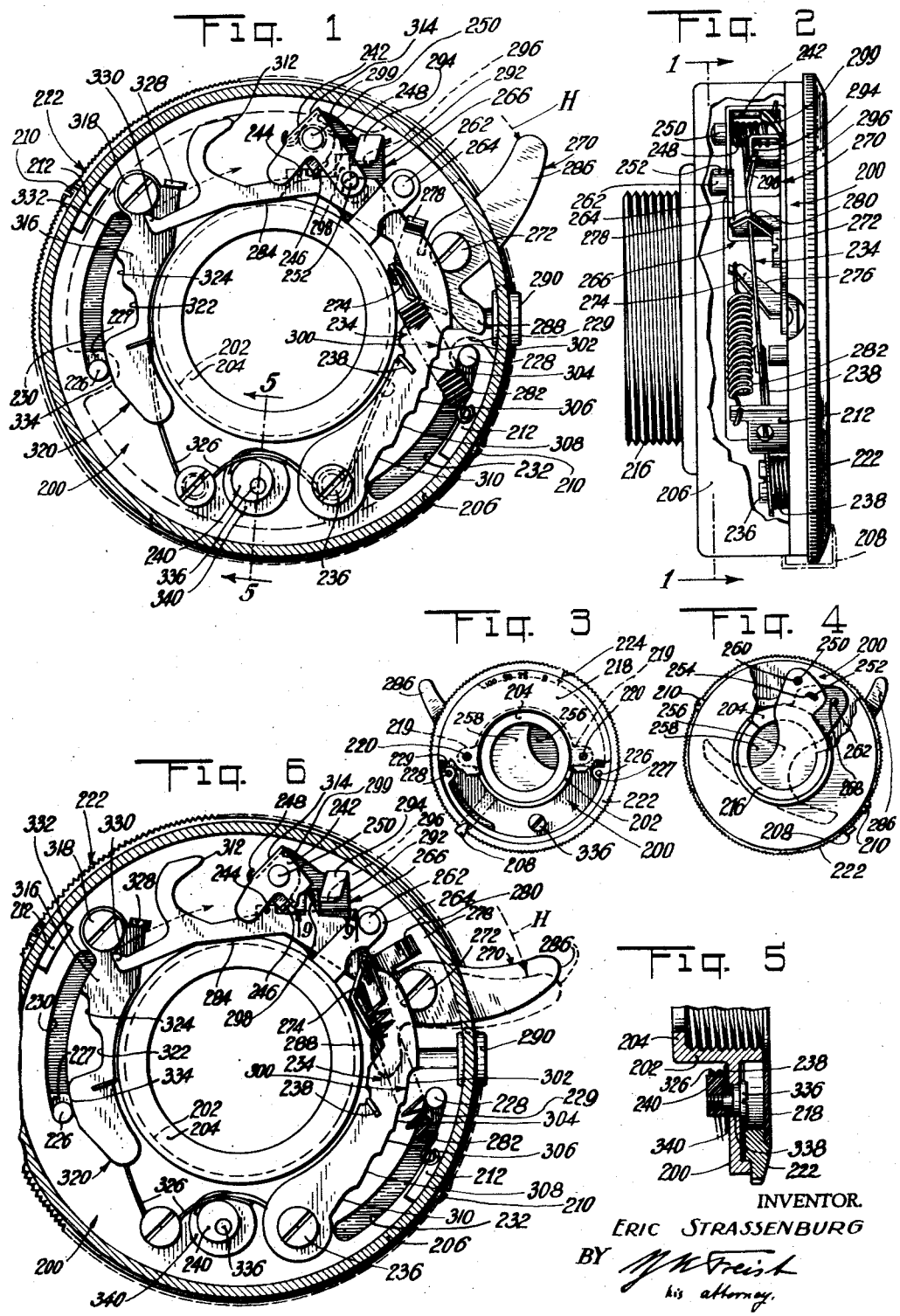
INVENTOR.
ERIC STRASSENBURG
BY
his attorney.

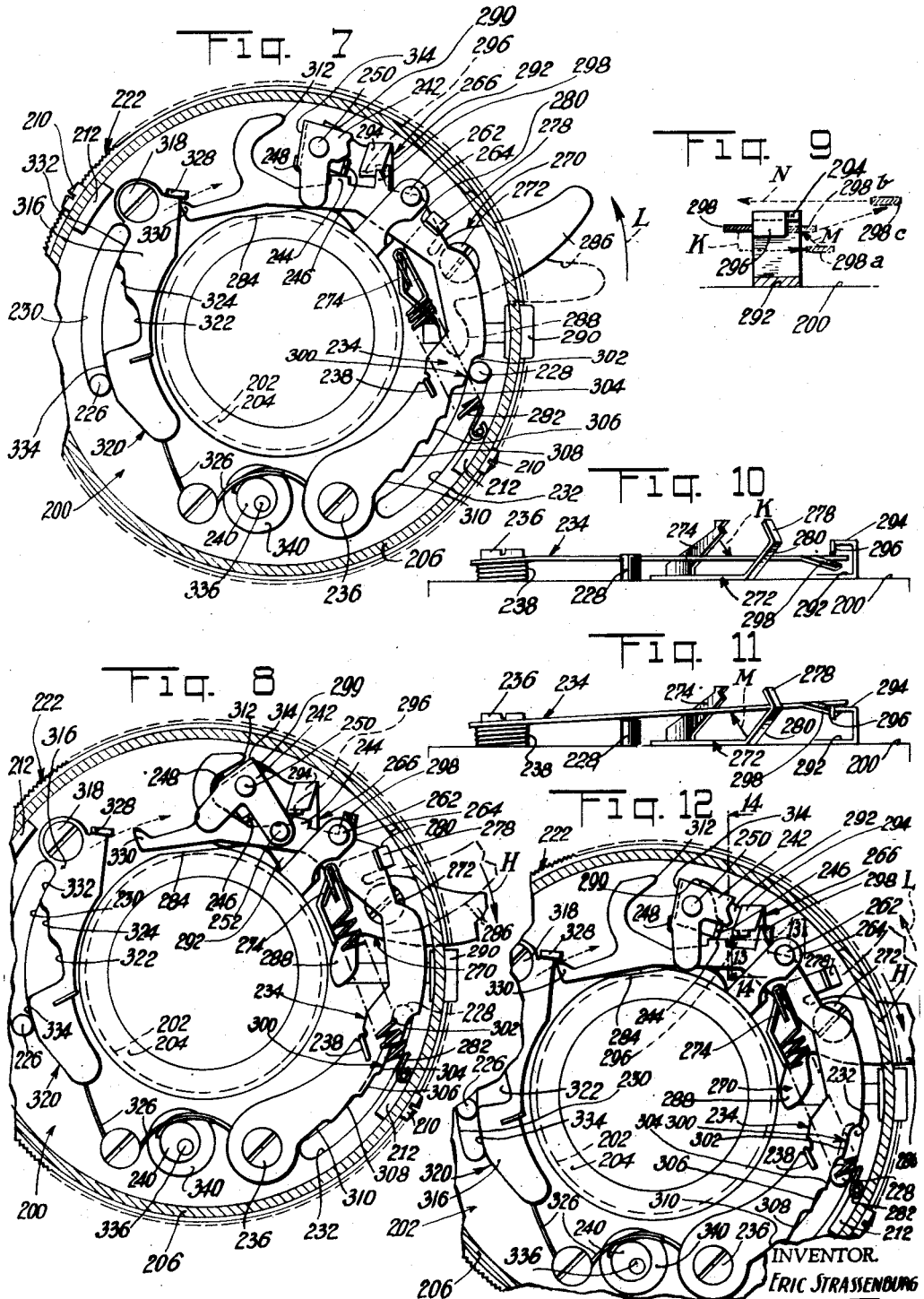

Sept. 15, 1942.  E. STRASSENBURG  2,295,812
PHOTOGRAPHIC SHUTTER
Filed Sept. 7, 1940  4 Sheets-Sheet 3
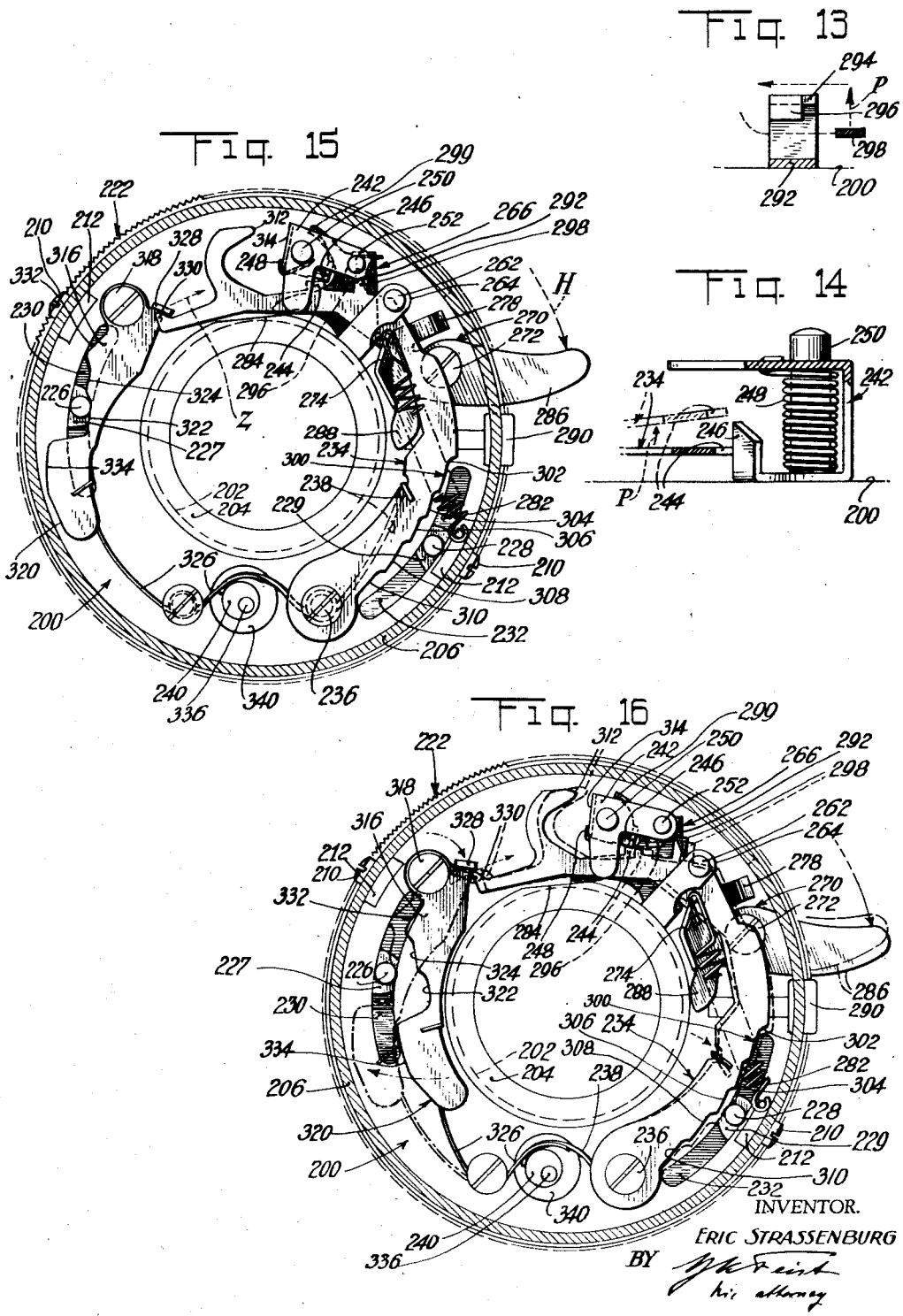
INVENTOR.
ERIC STRASSENBURG
BY
his attorney Sept. 15, 1942.  E. STRASSENBURG  2,295,812
PHOTOGRAPHIC SHUTTER
Filed Sept. 7, 1940  4 Sheets-Sheet 4
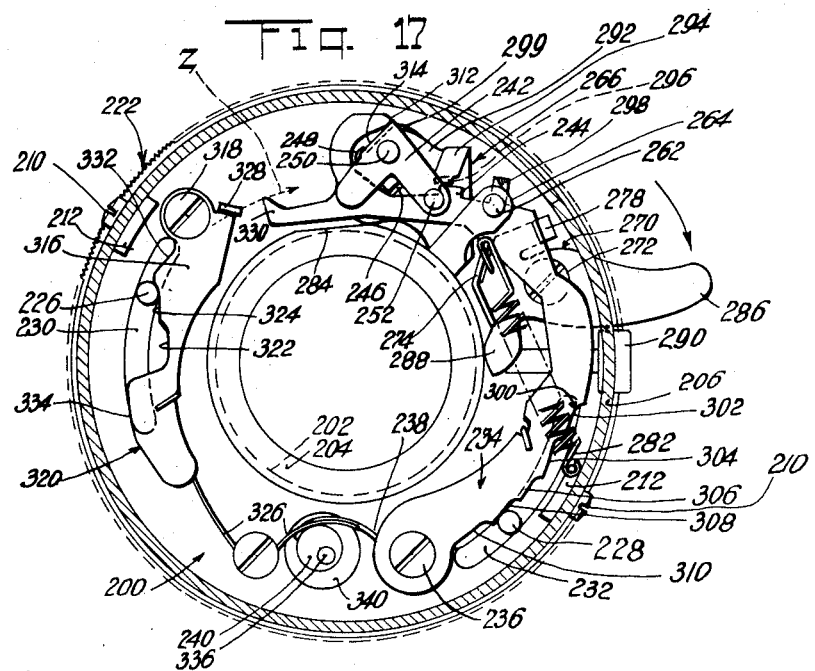
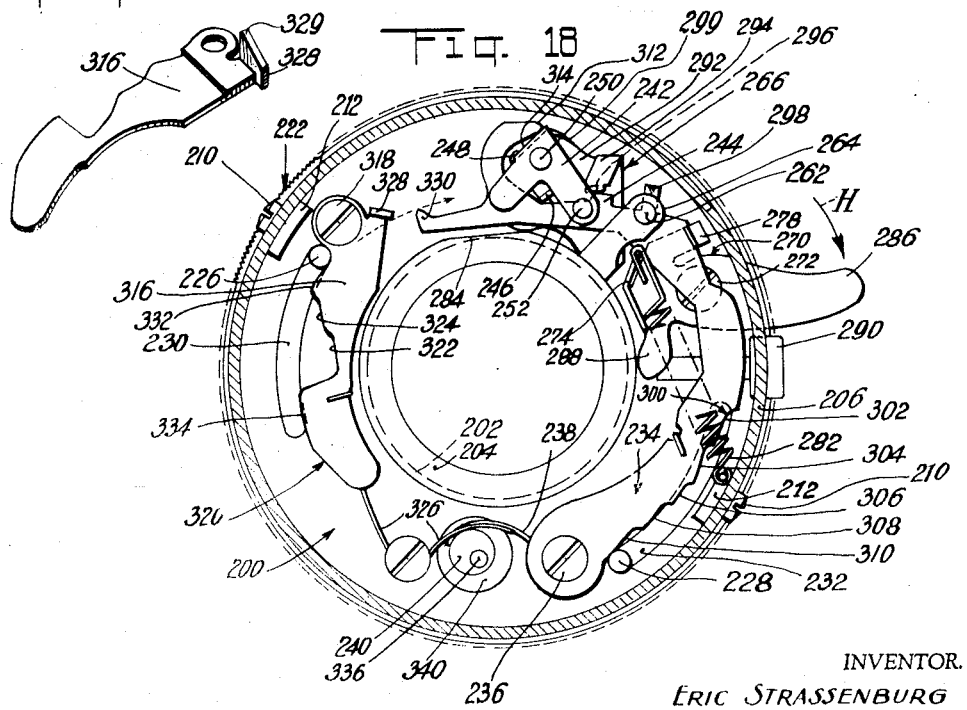
INVENTOR.
ERIC STRASSENBURG
BY
his attorney Patented Sept. 15, 1942

2,295,812

UNITED STATES PATENT OFFICE 2,295,812

PHOTOGRAPHIC SHUTTER

Eric Strassenburg, New York, N. Y.

Application September 7, 1940, Serial No. 355,789

18 Claims. (Cl. 95—62)

My invention relates to photography, and more particularly to photographic shutters of the type described in my copending patent application Serial #252,848, filed on January 26, 1939, now Patent No. 2,214,754 of September 17, 1940.

One object of my invention is to simplify the mechanism of the photographic shutters of said type.

Another object of my invention is to provide a shutter with improved means for controlling the speed of the main lever.

A further object of my invention is to provide a shutter, wherein the main lever and the means for controlling the speed of the main lever are subjected to the action of individual springs, and wherein adjusting means are provided for a simultaneous adjustment of the tensions of said two springs.

In the photographic shutter described in my copending patent application Serial #252,848 the main lever is held against the wall of the housing, when the main lever is in the tensioned inoperative position, and the main lever is swung by its spring toward the center portion of the shutter, when the main lever is released for the actuation of the shutter blades.

In order to obtain the above mentioned objects, I provide a shutter, wherein the main lever is held against a central abutment, when the main lever is in the tensioned inoperative position, and wherein the main lever is swung by its spring toward the wall of the housing of the shutter, when the main lever is released for the actuation of the shutter blades. This arrangement and operation of the main lever, which are reversed in comparison with that of the shutter described in my copending patent application Serial #252,848, permit the cooperation of the main lever with my new spring pressed pivoted braking lever controlling the speed of the main lever if engaged by the latter. On the other hand, said spring pressed pivoted braking lever permits the omission of means for changing the tension of the spring of the main lever by the setting mechanism for the determination of various "instantaneous"—exposures, so that the tension of the spring of the main lever remains unchanged if once adjusted by adjusting means independent of the mechanism for moving the shutter blades.

The above mentioned objects and advantages as well as other objects and advantages will be more fully disclosed in the following specification reference being had to the accompanying drawings forming part of this specification in which:

Fig. 1 is a sectional view of my photographic shutter, taken on line 1—1 of Fig. 2, said view illustrating the shutter mechanism as seen from the rear, the shutter blades being omitted and the parts of the shutter mechanism being in normal inoperative position, Fig. 2 is a side view of the shutter, a portion of the housing of the shutter being broken away to show the shutter mechanism, Fig. 3 is a front end view of the shutter, in reduced scale, a portion of the front plate being broken away, Fig. 4 is a rear end view of the shutter, in reduced scale, a portion of the housing being broken away, Fig. 5 is a sectional view of a portion of the shutter, taken on line 5—5 of Fig. 1, said view illustrating the adjusting means for the adjustment of the tension of the springs of the main lever and the braking lever, Figs. 6–8 are fragmentary views of the shutter mechanism set for "time"-exposure, illustrating the parts of the mechanism in various positions during the "time"-exposure, Fig. 9 is a cross-sectional view of parts of the shutter, taken on line 9—9 of Fig. 6, Figs. 10 and 11 are somewhat diagrammatic side end views of the main lever and the locking member cooperating therewith, illustrating two different positions of the main lever, Fig. 12 is a fragmentary view of the shutter mechanism set for "bulb"-exposure, illustrating the parts in position for open shutter blades, Fig. 13 is a cross-sectional view of parts of the shutter, taken on line 13—13 of Fig. 12, Fig. 14 is a cross-sectional view of the main lever and the blade carrier, taken on line 14—14 of Fig. 12, Figs. 15 and 16 are views of the shutter mechanism set for "1/25 sec."-exposure, illustrating the parts of the mechanism in various positions during said instantaneous exposure, Fig. 17 is a view of the shutter mechanism set for "1/50 sec."-exposure, illustrating the parts of the mechanism after the actuation of the blade carrier by the main lever, Fig. 18 is a view of the shutter mechanism set for "1/100 sec."-exposure, illustrating the parts of the mechanism after the actuation of the blade carrier by the main lever, and Fig. 19 is a perspective view of the braking lever.

Referring now to the drawings, 200 indicates the mounting plate of the shutter carrying the shutter mechanism proper. Said mounting plate is integral with a hollow cylindrical center portion 202 forming the exposure aperture and being provided with a flange 204. As best shown in Fig. 5, the inner wall of said cylindrical portion 202 is screw threaded for the reception of a conventional objective.

206 indicates the housing of the shutter equipped with a conventional iris diaphragm (not shown). The pointer 208 of the iris diaphragm projects from the housing in usual manner. The housing is secured to the mounting plate 202 by means of screws 210 screwed into holes of lugs 212 mounted on said plate 202. The housing has a screw threaded cylindrical portion 216, by means of which the shutter may be mounted on a camera.

As best shown in Figs. 3 and 5, a front plate 218 provided with markings "T," "B," "25," "50," "100" (abbreviations for "time"-exposure, "bulb"-exposure, "1/25 sec."-exposure, "1/50 sec."-exposure, "1/100 sec."-exposure) is secured to lugs 219 of the mounting element 200, 202 by means of screws 220. A setting ring 222 provided with an indicating mark 224 is rotatably and adjustably arranged between the front plate 218 and the mounting plate 200. Controlling pins 226 and 228 secured to lugs 227 and 229 of the setting ring 222 extend through slots 230 and 232 of the mounting plate 200 and may be shifted in said slots. When the mark 224 is opposite the marking "T" as shown in Fig. 3, the controlling pins 226 and 228 are in the position shown in Fig. 1 and abut against one end of the slots 230 and 232 respectively. When the setting ring is rotated and set in such a way that the mark 224 is opposite the marking "100," the controlling pins 226 and 228 abut against the opposite ends of the slots 230 and 232 as shown in Fig. 18. A setting of the ring 222 with the mark 224 opposite to the markings "B," "25" or "50" cause intermediate positions of the controlling pins 226 and 228 as shown in Figs. 12, 15 and 17 for example.

234 generally indicates the main lever pivotally mounted on the mounting plate 200 at 236. A spring 238 having one of its ends abutting against an adjustable cam-means or eccentric disc 240 and having its other end engaged with the main lever 234 tends to rotate the main lever in clockwise direction for an actuation of the blade carrier 242 in counter-clockwise direction by the extension 244 cooperating with a lug 246 on said blade carrier. A spring 248 connected to said blade carrier tends to return the latter about its pivot 250 into its normal inoperative position for closed shutter blades as shown in Fig. 1 after its disengagement from the extension 244 of the main lever. The blade carrier carries a pin 252 engaged with an elongated slot 254 of each of the two shutter blades 256 and 258 arranged one above the other as shown in Fig. 4. The pivot 250 of the blade carrier 242 extends through a hole 260 of the shutter blade 256, and a pin 262 mounted on an arm 264 of a member generally indicated by 266 extends through a hole 268 of the shutter blade 258, so that the shutter blades may be rotated about the pins 250 and 262 and may slide upon each other and the flange 204 supporting same for opening or closing the exposure aperture, when the blade carrier 242 with its pin 252 is swung about the pivot 250.

270 generally indicates a trigger pivotally mounted on the mounting plate 200 at 272. Said trigger is provided with a releasing arm 274 projecting from the body of the trigger as best shown in Fig. 2. The releasing arm 274 has a cam-like lower edge 276 adapted to cooperate with the main lever 234 for releasing same in a manner to be described hereinafter. Furthermore, the trigger 270 has a bent actuating arm 278 also projecting from the body of the trigger as best shown in Fig. 2. Said actuating arm has a cam-like side edge 280 adapted to cooperate with the main lever for a purpose to be described hereinafter. A spring 282 stretched between the lug 212 of the mounting plate and the end of the releasing arm or cam 274 tends to rotate the trigger in counter-clockwise direction. The spring 282 of the trigger is stronger than the spring 238 of the main lever, and, if the trigger is in its normal inoperative position shown in Fig. 1, the actuating arm 278 of the trigger is engaged with the main lever, so that the latter is held by the action of the spring 282 in a tensioned inoperative position against a central abutment 284 formed by a flattened portion of the wall of the central cylindrical portion 202. An arm 286 of the trigger extending through a slot of the housing of the shutter projects therefrom to form a conventional handle for the rotation of the trigger by hand. An extension 288 of the trigger inside the housing of the shutter serves as an abutment for cooperation with the end of a conventional wire release to be screwed into a hub 290.

The member 266 has a second arm 292 substantially paralleling the mounting plate. The free end 294 of said arm 292 is bent away from the mounting plate and has an extension 296 directed toward the mounting plate, which forms a locking member for cooperation with a lug 298 arranged on the main lever 234 (see Figs. 1, 2, 6, 7 and 9 for example). The action of said locking member 296 will be described hereinafter. Furthermore, said second arm 292 of the member 266 has an extension 299, against which the blade carrier 242 is held by its spring 248 in its normal position for closed shutter blades, as shown in Fig. 1 for example.

The controlling pin 228 of the setting ring 222 cooperates with an irregular controlling edge 300 of the main lever 234 having recesses 302—310 of various depths. If the main lever is released in a manner to be described hereinafter and is rotated by the action of its spring 238, the controlling edge 300 abuts against the controlling pin 228 forming a stop to limit the angular movement of the main lever. Depending on the setting of the controlling pin 228 for "T"-exposure, "B"-exposure or an "instantaneous"-exposure, the pin comes in contact with either one of the recesses 302—310 of the controlling edge (compare Figs. 7, 12, 15, 17 and 18 with each other), and the deeper the recess and/or the shorter the distance between the recess and the pivot point 236, the greater the angular movement of the main lever.

The main lever 234 has a hook-like extension 312 which may strike against the wall 314 of the blade carrier 242 to secure a quick closing of the shutter blades before the spring 248 of the blade carrier may act to close the shutter blades. The hook-like extension 312, however, may contact the wall 314 of the blade carrier only, if the controlling pin 228 is set for "1/50 sec." or "1/100 sec."-exposure. In this instance the pin 228 contacts the recess 308 or 310 as shown in Figs. 17 and 18, so that the angular movement of the main lever is sufficient to permit an engagement between the hook-like extension 312 and the wall 314 of the blade carrier.

In order to obtain various speeds of the main lever 234 for "1/25 sec."-exposure, "1/50 sec."-exposure and "1/100 sec."-exposure, I provide a braking lever 316 pivotally mounted on the mounting plate 200 at 318. Said braking lever 316 is provided with an irregular controlling edge 320 having recesses 322 and 324 of various depths. A spring 326 having one of its ends abutting against the adjustable eccentric disc 240 and having its other end engaged with the braking lever 316 tends to urge the latter with its controlling edge 320 against the controlling pin 226 of the setting ring. A catching means or lug 328 is arranged on the braking lever 316 near the pivot point 318 thereof. The edge 329 of the lug 328 is inclined as best shown in Fig. 19. The end of the main lever 234 forms a catching means or hook 330 adapted to cooperate with said catching lug 328, if the latter is in the path of the hook. If, after the release of the main lever 234, the catching hook 330 catches the catching lug 328, as indicated in Figs. 15 and 17 (see path of arrow Z), the main lever is forced to swing the mass of the braking lever 316 about its pivot 318 against the action of the spring 326 until it becomes disengaged from the braking lever, whereby the movement of the main lever is retarded. Obviously, the greater the angular movement of the braking lever, the greater the retarding effect. On the other hand, the deeper the recess of the controlling edge cooperating with the controlling pin 226, the greater the angular movement. Therefore, if the setting ring is set for "1/25 sec."-exposure, the controlling pin 226 contacts the recess 322 as shown in Fig. 15, and if the setting ring is set for "1/50 sec."-exposure, the controlling pin 226 contacts the recess 324 as shown in Fig. 17. In the case of a very short instantaneous exposure ("1/100 sec"-exposure for example), a retarding effect on the main lever is undesirable. Therefore, if the setting ring is set for "1/100 sec."-exposure, the controlling pin 226 contacts the portion 332 of the controlling edge, as shown in Fig. 18, whereby the catching lug 328 is brought out of the path of the catching hook 330, so that an unobstructed quick movement of the main lever is obtained under the full strength of its spring 238. Of course, in the cases of "T"-exposure and "B"-exposure, retarding effects on the main lever are also undesirable. Therefore, if the setting ring is set for "T"-exposure or "B"-exposure, the controlling pin 226 contacts the portion 334 of the controlling edge as shown in Figs. 1 and 12, whereby the catching lug 328 is also brought out of the path of the catching hook 330 of the main lever and the movement of the latter is unobstructed.

As pointed out above, the spring 326 of the braking lever counteracts the spring 238 of the main lever, when the shutter is set for 1/25 or 1/50 sec. The opening time of the blade carrier for a "1/100 sec."-exposure, however, is determined by the action of the main lever spring 238 alone. Therefore, when the parts of the shutter are assembled, a predetermined tension of the main lever spring 238 must be adjusted to secure an exact exposure of 1/100 sec., as it is practically impossible to manufacture the springs with the exact tension required. Now, if for example only the tension of the main lever spring would be increased by the adjusting means, and the tension of the braking lever spring would remain unchanged as it comes from the factory, the relation between the tensions of the two springs ordered from the factory would be changed, so that the tension of the main lever spring would be too high with respect to the tension of the braking lever spring for "1/25 sec."-exposure and "1/50 sec."-exposure with the result of opening times of the blade carrier shorter than 1/25 sec. or 1/50 sec. respectively. In order to overcome this disadvantage, I provide the adjustable disc 240 cooperating with both springs 238 and 326 as described above, so that the tensions of said springs may be simultaneously adjusted with respect to each other. If, for example, the tension of the main lever spring 238 is increased to a certain extent as may be necessary for obtaining an exact exposure of 1/100 sec., the tension of the braking lever spring 326 is proportionally increased at the same time, so that the counteraction of said spring for "1/25 sec."-exposure and "1/50 sec."-exposure is proportionally increased and exact "1/25" and "1/50 sec."-exposures may be obtained. The construction of said adjusting means for the springs 238 and 326 is best shown in Figs. 1, 3 and 5. An adjusting screw 336 extending through a hole 338 of the mounting plate 200 is screwed into an eccentric hole of the disc 240, a washer 340 being interposed between the disc and the mounting plate. The eccentric disc 240 forms a cam-means, which may be adjusted and held in various positions by the screw 336. Depending on the variation of the position of the eccentric disc 240, the tension of the springs 238 and 326 resting thereon may be increased or decreased. Obviously, the adjustable cam-means 240, 336 is independent of the mechanism for moving the shutter blades and is to be used only for the adjustment of the tensions of the springs 238 and 326 when the parts of the shutter are assembled or for a readjustment of the tensions of said springs after a removal of the front plate 218.

The operation of the photographic shutter is as follows:

*Time-exposure*

The shutter shown in Figs. 1, 3 and 6–11 is set for "T"-exposure ("time"-exposure).

When the trigger 270 is depressed in the direction of the arrow H (see Fig. 1) against the action of its spring 282, the main lever 234 follows the actuating arm 278 under the action of its spring 238, until, after a short movement, the lug 298 of the main lever abuts against one side of the locking member 296 holding the main lever in a still tensioned inoperative position, as shown in Figs. 6 and 9. Now, when during a further rotation of the trigger in the direction of the arrow H the trigger reaches the position shown in full lines in Fig. 6, the cam-like releasing arm 274 is engaged with the main lever 234. A continuation of the rotation of the trigger toward the position shown in dash lines in Fig. 6 results in a depression of the main lever 234 by the cam-like releasing arm 274 in the direction of the arrow K as shown in Figs. 9 and 10. Thus, the lug 298 of the main lever is disengaged from the locking member 296 and the main lever is released, so that it may be rotated in clockwise direction by the action of its spring 238, until the recess 302 of its controlling edge abuts against the controlling pin 228. This operating movement of the main lever is not retarded by the braking lever 316, as the controlling pin 226 holds the catching lug 328 thereof out of the path of the catching hook 330 of the main lever. During said operating movement of the main lever, the extension 244 thereof comes in engagement with the lug 246 of the blade carrier, so that the latter is rotated about its pivot into the position for open shutter blades. The lug 298 of the main lever occupies the position 298a shown in dash lines in Fig. 9, when the recess 302 abuts against the pin 228. Now, when the trigger 270 is released, the spring 282 rotates the trigger in the direction of the arrow L (see Fig. 7), whereby the cam-like actuating arm 278 comes in engagement with the main lever 234. During the rotation of the trigger from the position shown in dash lines in Fig. 7 into the position shown in full lines in said Fig. 7, the cam-like actuating arm lifts the main lever in the direction of the arrow M shown in Figs. 9 and 11, so that the lug 298 strikes against the other side of the locking member 296 as shown in Figs. 7 and 11. In Fig. 9 this position of the lug 298 is shown in dash lines and is indicated by 298b. At the same time the body of the main lever has been lifted by the actuating arm 278 into a level above the controlling pin 228 as best shown in Fig. 11. When the lug 298 abuts against the locking member 296 as shown in Fig. 7, the trigger and the main lever are prevented from a further rotation in counter-clockwise direction into their normal inoperative position, and the extension 244 of the main lever is still in contact with the lug 246 of the blade carrier 242, so that the latter is held in the position for open shutter blades. Thus, the first step of the "T"-exposure is completed.

When the user of the shutter starts the second step of the "T"-exposure for closing the shutter blades and rotates again the trigger in the direction of the arrow H from the position shown in full lines in Fig. 7 and in dash lines in Fig. 8 into the position shown in full lines in Fig. 8, the main lever follows the actuating arm into its end position by the action of the spring 238, as now the main lever may be moved above the upper end of the pin 228, as clearly shown in Fig. 8. This increased angular movement of the main lever 234 results in a disengagement of the extension 244 of the main lever from the lug 246 of the blade carrier 242, so that the latter is returned into its position for closed shutter blades by its spring 248, as shown in Fig. 8. During the movement of the main lever above the upper end of the pin 228 the lug 298 has been brought into the raised position 298c shown in dash lines in Fig. 9. Now, when the trigger is released and is returned by its spring 282 into its normal inoperative position shown in Fig. 1, the actuating arm 278 returns the main lever 234 into its tensioned inoperative position against the central abutment 284. During this return movement of the main lever the lug 298 is moved outside (above) the locking member 296 in the direction of the arrow N as shown in Fig. 9. Now, the actuating arm 278 of the spring actuated trigger 270 holds the main lever 234 against the central abutment 284. The second step of the "T"-exposure is completed, and the shutter is ready for the next operation.

*Bulb-exposure*

The shutter shown in Figs. 12–14 is set for "B"-exposure ("bulb"-exposure).

If it is desired to set the shutter for "B"-exposure, the setting ring 222 is rotated, until the mark 224 is opposite the marking "B," whereby the controlling pins 226 and 228 are moved into the position shown in Fig. 12. It may be noted, that the controlling pin 226 still holds the braking lever 316 with its catching lug 328 out of the path of the catching hook 330 of the main lever 234. When the trigger 270 is depressed in the direction of the arrow H, the main lever 234 is released and disengaged from the locking member 296 in the same manner as described in connection with the "T"-exposure. Now, however, the recess 304 having a greater depth than the recess 302 of the controlling edge 300 of the main lever abuts against the controlling pin 228, whereby the angular movement of the main lever is somewhat increased in comparison with the angular movement of the main lever when the recess 302 abuts against the pin 228 during the first step of the "T"-exposure. Therefore, the lug 298 reaches the position shown in Figs. 12 and 13, when the shutter is set for "B"-exposure, and said position is somewhat more remote from the locking member 296 than the position 298a of the lug shown in Fig. 9 for "T"-exposure. When the parts of the shutter mechanism are in the position shown in Fig. 12 for "B"-exposure, the extension 244 of the main lever is still in contact with the lug 246 of the blade carrier, so that the latter is held in position for open shutter blades as long as the trigger 270 is held in its depressed position shown in full lines in Fig. 12.

Now, when the trigger is released and is returned by its spring 282 into its inoperative position in the direction of the arrow L, the actuating arm 278 contacts the main lever 234 and lifts same in the direction of the arrow P (see Figs. 13 and 14), whereby the extension 244 is disengaged from the lug 246 for an immediate return of the blade carrier by its spring 248 into position for closed shutter blades and the lug 298 is brought into a level above the locking member 296, whereupon the main lever 234 is returned by the actuating arm 278 into its normal tensioned inoperative position against the central abutment 284; during said return movement of the main lever, the lug 298 is moved outside (above) the locking member 296 as indicated in Fig. 13. Now, the shutter is ready for the next operation.

*Instantaneous exposure*

Three different instantaneous exposures ("1/25 sec."-exposure, "1/50 sec."-exposure, "1/100 sec."-exposure) may be carried out with the shutter illustrated in the drawings as an example of my invention.

The shutter shown in Figs. 15 and 16 is set for "1/25 sec."-exposure.

If it is desired to set the shutter for "1/25 sec."-exposure, the setting ring 222 is rotated, until the mark 224 is opposite the marking "25," whereby the controlling pins 226 and 228 are moved into the position shown in Figs. 15 and 16. Now, the recess 322 of the controlling edge 320 of the braking lever 316 contacts the controlling pin 226, so that the catching member 328 of the braking lever is brought into the path of the catching hook 330 of the main lever. When the trigger 270 is depressed in the direction of the arrow H, the main lever 234 is released and disengaged from the locking member 296 in the same manner as described in connection with the "T"-exposure. During the operating movement of the main lever in clockwise direction the extension 244 thereof strikes against the lug 246 of the blade carrier, so that the latter is swung into position for open shutter blades. When, at the end of the operating movement, the main lever reaches the position shown in dash lines in Fig. 16, the recess 306 abuts against the controlling pin 228. Said recess permits an angular movement of the main lever to such a degree, that the extension 244 becomes disengaged from the lug 246 and the blade carrier is immediately returned by its spring 248 into position for closed shutter blades. The duration of the opening position of the blade carrier is determined by the duration of the contact between the extension 244 and the lug 246, i. e., by the speed of the main lever during its operating movement. When the shutter is set for "1/25 sec."-exposure, as shown in Figs. 15 and 16, the speed of the main lever is retarded by the braking lever 316. As soon as, during the operating movement of the main lever in clock-wise direction, the main lever reaches the position shown in Fig. 15, the catching hook 330 of the main lever catches the catching lug 328 of the braking lever, so that, during a portion of the subsequent continuation of the operating movement of the main lever, the braking lever is rotated about its pivot 318 against the action of the spring 326, whereby the speed of the main lever is retarded, so that an opening time of the blade carrier of 1/25 sec. is obtained. As soon as, during the continuation of the operating movement of the main lever, the main lever reaches the position shown in full lines in Fig. 16, the catching hook 330 becomes disengaged from the catching lug 328, and the braking lever 316 is returned by its spring 326 into its original position shown in dot and dash lines in Fig. 16. The inclined edge 329 of the lug 328 serves to facilitate the above described disengagement of the hook 330 from the lug 328. After a subsequent release of the trigger 270, the main lever is returned into its normal inoperative position by the actuating arm 278 in the same manner as described in connection with the "B"-exposure. Now the shutter is ready for the next operation. It may be noted that the hook-like extension 312 of the main lever does not contact the wall 314 of the blade carrier in the end position of the main lever shown in dash lines in Fig. 16.

The shutter shown in Fig. 17 is set for "1/50 sec."-exposure.

If it is desired to set the shutter for "1/50 sec."-exposure, the setting ring 222 is rotated, until the mark 224 is opposite the marking "50," whereby the controlling pins 226 and 228 are moved into the position shown in Fig. 17. Now, the recess 324 of the controlling edge 320 of the braking lever 316 contacts the controlling pin 326, so that the catching lug 328 is still in the path of the catching hook 330 of the main lever. The operation of the shutter set for "1/50 sec."-exposure is substantially the same as described in connection with the "1/25 sec."-exposure, with the only difference, that the angular movement of the braking lever and its retarding effect are smaller due to the minor depth of the recess 324, and that the recess 308 of the controlling edge 300 of the main lever abuts against the controlling pin 228, whereby the angular movement of the main lever is increased, so that its hook-like extension 312 may strike against the wall 314 of the blade carrier to cause a quick closing movement thereof.

The shutter shown in Fig. 18 is set for "1/100 sec."-exposure.

If it is desired to set the shutter for "1/100 sec."-exposure, the setting ring 222 is rotated, until the mark 224 is opposite the marking "100," whereby the controlling pins 226 and 228 are moved into the position shown in Fig. 18. Now, the position 332 of the controlling edge 320 of the braking lever 316 contacts the controlling pin 226, so that the catching lug 328 is brought out of the path of the catching hook 330 of the main lever. When the trigger 270 is depressed in the direction of the arrow H, the main lever 234 is released and disengaged from the locking member 296 in the same manner as described in connection with the "T"-exposure. In contrast to the "1/25 sec."- and "1/50 sec."-exposures, however, the operating movement of the main lever is not retarded, as the catching hook 330 cannot catch the catching lug 328. At the end of the operating movement of the main lever, the recess 310 of the controlling edge 300 of the main lever 234 abuts against the controlling pin 228, as shown in Fig. 18. The recess 310 is of such a depth, that the main lever carries out an angular movement of such a degree, that the hook-like extension 312 of the main lever strikes against the wall 314 of the blade carrier in position for open shutter blades. The stroke of the extension 312 against the wall 314 causes a return movement of the blade carrier into position for closed shutter blades before the return spring 248 of the blade carrier may act, so that an extremely quick closing movement of the shutter blades in obtained. Upon release of the trigger 270, the main lever is returned into its tensioned inoperative position as described in connection with the "B"-exposure, and the shutter is ready for the next operation.

I have described preferred embodiments of my invention, but it is clear that numerous changes and ommissions may be made without departing from the spirit of my invention. For example, the shutter may be constructed for more or less instantaneous exposures by changing the shape of the controlling edges of the main lever and braking lever. If the shutter is constructed for more instantaneous exposures than those shown in the illustrated embodiment, the controlling edge of the main lever may be shaped in such a way, that the hook-like extension of the main lever does not contact the blade carrier if the shutter is set for "1/50 sec."-exposure, but contacts the blade carrier only if the shutter is set for shorter instantaneous exposures of 1/100, 1/200, 1/300 sec., etc., for example. Furthermore, the adjusting means for the springs of the main lever and braking lever may be separated from each other, and each spring may have its own adjusting means. Moreover, if desired, an adjustable cam-means of the type described may also be used for the adjustment of the tension of the spring of a main lever or other spring pressed elements of a shutter of a type different from that shown in the drawings.

Although preferably the new braking mechanism is used in combination with the mechanism for having the shutter blades as shown in the drawings, it is emphasized that the merits of the invention are not limited to the described and illustrated combination, but that the braking mechanism per se and the mechanism for moving the shutter blades per se also have inventive merits. For example, the braking mechanism could be used in any other type of a shutter for retarding the movement of a movable element, or the mechanism for moving the shutter blades could be used without the specific braking mechanism shown in the drawings or with a different braking mechanism.

What I claim is:

1. A photographic shutter comprising: shutter blades, a spring pressed pivoted main lever for operating said shutter blades, a central abutment, a locking member in the path of said main lever, a trigger for cooperation with said main lever, resilient means connected to said trigger for urging same into its normal inoperative position, a cam-like actuating means arranged on said trigger, said cam-like actuating means being adapted to engage said said main lever for holding same in a tensioned inoperative position against said central abutment when the trigger is in its inoperative position, said main lever abutting against said locking member in a tensioned inoperative position upon the initial releasing movement of said trigger, and a cam-like releasing means arranged on said trigger, said cam-like releasing means being adapted to engage said main lever for releasing same from said locking member to initiate the operation of the main lever in a direction beyond said locking member upon further releasing movement of said trigger, and said cam-like actuating means being adapted to engage said main lever for returning same outside said locking member into said tensioned inoperative position against said central abutment when said resilient means returns said trigger into its normal inoperative position.

2. In combination with a photographic shutter as claimed in claim 1, an adjustable setting mechanism, an adjusting member in said setting mechanism, a portion of said main lever having an irregular controlling edge, said adjusting member forming a stop adapted to cooperate with said controlling edge of the main lever for the determination of "time"-exposure, "bulb"-exposure or various "instantaneous"-exposures to be caused by the operation of said main lever, and a lug arranged on said main lever, said lug abutting against one side of said locking member upon the initial releasing movement of said trigger, said lug being in a position beyond said locking member after the further releasing movement of said trigger when the setting mechanism is set for either one of the time "time"-exposure, "bulb"-exposure or "instantaneous"-exposure, said cam-like actuating means of the trigger being adapted to urge said lug against the other side of said locking member upon a first partial return movement of the trigger to hold the main lever in an operative position for open shutter blades when the setting mechanism is set for "time"-exposure, and said cam-like actuating means being adapted to move said lug outside said locking member for returning the main lever into its tensioned inoperative position, upon a return movement of the trigger when the setting mechanism is set for either one of the "bulb"-exposure or "instantaneous"-exposure, and upon a second return movement of the trigger when the setting mechanism is set for "time"-exposure.

3. A photographic shutter as claimed in claim 1, wherein an adjustable means is provided for adjusting a predetermined tension of the spring of the main lever, said adjustable means being independent of the mechanism for moving the shutter blades.

4. In combination with a photographic shutter as claimed in claim 1, an adjustable cam-means, the spring of said main lever having a free end abutting against said cam-means, said cam-means being independent of the mechanism for moving the shutter blades and being adapted to adjust a predetermined tension of said spring.

5. A photographic shutter comprising: shutter blades, a spring pressed pivoted main lever for operating said shutter blades, locking means for retaining said main lever in a tensioned inoperative position, a trigger for releasing said main lever from said locking means to initiate the operation of the main lever, adjustable braking means adapted to cooperate with said main lever for controlling the speed thereof when released, an adjustable setting mechanism, said setting mechanism being adapted to cooperate with said braking means and with said spring pressed main lever for the determination of various exposures to be caused by the operation of said main lever, resilient means connected to said trigger for returning same from its releasing position into its normal inoperative position, and an actuating element arranged on said trigger, said actuating element being adapted to engage said main lever for returning same into a tensioned inoperative position when said resilient means returns said trigger into its normal inoperative position.

6. A photographic shutter comprising: shutter blades, a spring pressed pivoted main lever for operating said shutter blades, locking means for retaining said main lever in a tensioned inoperative position, a trigger for releasing said main lever from said locking means to initiate the operation of the main lever, an adjustable pivoted spring pressed braking lever adapted to cooperate with said main lever for controlling the speed thereof when released, catching means on said braking lever for engagement with said main lever, an adjustable setting mechanism for the determination of various exposures to be caused by the operation of said main lever, said setting mechanism being adapted to cooperate with said main lever for the control of the angular movement thereof and being adapted to cooperate with said braking lever for adjusting same in various braking positions of various degrees of braking effect with said catching means in the path of said main lever and for adjusting same in a non-braking position with said catching means out of the path of said main lever, resilient means connected to said trigger for returning same from its releasing position into its normal inoperative position, and an actuating element arranged on said trigger, said actuating element being adapted to engage said main lever for returning same into a tensioned inoperative position when said resilient means returns said trigger into its normal inoperative position.

7. A photographic shutter as claimed in claim 6, an adjusting member in said setting mechanism, said braking lever having an irregular controlling edge, said adjusting member being adapted to cooperate with said controlling edge of the braking lever for adjusting same in various positions, said catching means being arranged in such a relationship to said main lever that, after a previous engagement, it becomes disengaged from said main lever at the end of the operating movement thereof, and the spring of the braking lever being adapted to return the braking lever and urge the controlling edge thereof against said adjusting member.

8. A photographic shutter as claimed in claim 6, wherein an adjustable means is provided for a simultaneous adjustment of a predetermined tension of the springs of the main lever and of the braking lever.

9. In combination with a photographic shutter as claimed in claim 6, an adjustable cam-means, the spring of the main lever and the spring of the braking lever each having a free end abutting against said cam-means, and said cam-means being adapted to adjust simultaneously a predetermined tension of said springs.

10. A photographic shutter comprising: shutter blades, a spring pressed pivoted main lever for operating said shutter blades, a central abutment, a locking member in the path of said main lever, a trigger for cooperation with said main lever, resilient means connected to said trigger for urging same into its normal inoperative position, a cam-like actuating means arranged on said trigger, said cam-like actuating means being adapted to engage said main lever for holding same in a tensioned inoperative position against said central abutment when the trigger is in its inoperative position, said main lever abutting against said locking member in a tensioned inoperative position upon the initial releasing movement of said trigger, a cam-like releasing means arranged on said trigger, said cam-like releasing means being adapted to engage said main lever for releasing same from said locking member to initiate the operation of the main lever in a direction beyond said locking member upon further releasing movement of said trigger, and said cam-like actuating means being adapted to engage said main lever for returning same outside said locking member into said tensioned inoperative position against said central abutment when said resilient means returns said trigger into its normal inoperative position, adjustable braking means adapted to cooperate with said main lever for controlling the speed thereof when released, and an adjustable setting mechanism, said setting mechanism being adapted to cooperate with said braking means and with said spring pressed main lever for the determination of various exposures to be caused by the operation of said main lever.

11. A photographic shutter comprising: shutter blades, a spring pressed pivoted main lever for operating said shutter blades, a central abutment, a locking member in the path of said main lever, a trigger for cooperation with said main lever, resilient means connected to said trigger for urging same into its normal inoperative position, a cam-like actuating means arranged on said trigger, said cam-like actuating means being adapted to engage said main lever for holding same in a tensioned inoperative position against said central abutment when the trigger is in its inoperative position, said main lever abutting against said locking member in a tensioned inoperative position upon the initial releasing movement of said trigger, a cam-like releasing means arranged on said trigger, said cam-like releasing means being adapted to engage said main lever for releasing same from said locking member to initiate the operation of the main lever in a direction beyond said locking member upon further releasing movement of said trigger, and said cam-like actuating means being adapted to engage said main lever for returning same outside said locking member into said tensioned inoperative position against said central abutment when said resilient means returns said trigger into its normal inoperative position, an adjustable pivoted spring pressed braking lever adapted to cooperate with said main lever for controlling the speed thereof when released, catching means on said braking lever for engagement with said main lever, and an adjustable setting mechanism for the determination of various exposures to be caused by the operation of said main lever, said setting mechanism being adapted to cooperate with said main lever for the control of the angular movement thereof and being adapted to cooperate with said braking lever for adjusting same in various braking positions of various degrees of braking effect with said catching means in the path of said main lever and for adjusting same in a non-braking position with said catching means out of the path of said main lever.

12. A photographic shutter as claimed in claim 11, a first controlling means and a second controlling means in said setting mechanism, a portion of said main lever having an irregular controlling edge, said braking lever having an irregular controlling edge, said first controlling means being adapted to cooperate with said controlling edge of the main lever for the control of the angular movement thereof, and said second controlling means being adapted to cooperate with said controlling edge of the braking lever for adjusting same in various positions.

13. A photographic shutter as claimed in claim 11, said setting mechanism including a slidable adjusting ring, a first and a second controlling pin mounted on said adjusting ring, a portion of said main lever having an irregular controlling edge, said braking lever having an irregular controlling edge, said first controlling pin being adapted to cooperate with said controlling edge of the main lever for the control of the angular movement thereof, and said second controlling pin being adapted to cooperate with said controlling edge of the braking lever for adjusting same in various positions, said catching means being arranged in such a relationship to said main lever that, after a previous engagement, it becomes disengaged from the main lever at the end of the operating movement thereof, and the spring of the braking lever being adapted to return the braking lever and urge the controlling edge thereof against said second controlling pin.

14. In combination with a photographic shutter as claimed in claim 11, an adjustable cam-means, the spring of the main lever and the spring of the braking lever each having a free end abutting against said cam-means, and said cam-means being adapted to adjust simultaneously a predetermined tension of said springs.

15. A shutter mechanism comprising: shutter blades, a reciprocable member for the operation of the shutter blades, a spring pressed braking lever for controlling the speed of said reciprocable member, catching means rigidly secured to said braking lever, said catching means normally being in the path of said reciprocable member for an engagement with and a subsequent disengagement from said reciprocable member during the operative movement of said reciprocable member in one of its directions of movement, and means for guiding said reciprocable member past said catching means during the return movement of said reciprocable member in the opposite direction.

16. A shutter mechanism comprising: shutter blades, a reciprocable member for the operation of the shutter blades, a spring pressed braking lever for controlling the speed of said reciprocable member, catching means rigidly secured to said braking lever, means for adjusting the braking lever in various braking positions of various degrees of braking effect with said catching means in the path of said reciprocable member, said catching means being arranged for an engagement with and a subsequent disengagement from said reciprocable member during the operative movement of said reciprocable member in one of its directions of movement, and means for guiding said reciprocable member past said catching means during the return movement of said reciprocable member in the opposite direction.

17. A shutter mechanism comprising: shutter blades, a reciprocable member for the operation of the shutter blades, a spring pressed braking lever for controlling the speed of said reciprocable member, catching means rigidly secured to said braking lever, said catching means normally being in the path of said reciprocable member for an engagement with and a subsequent disengagement from said reciprocable member during the operative movement of said reciprocable member in one of its directions of movement, means for guiding said reciprocable member past said catching means during the return movement of said reciprocable member in the opposite direction, and adjusting means for varying the tension of the spring acting on the braking lever.

18. A shutter mechanism comprising: shutter blades, a reciprocable member for the operation of the shutter blades, a spring pressed braking lever for controlling the speed of said reciprocable member, catching means rigidly secured to said braking lever, means for adjusting the braking lever in various braking positions of various degrees of braking effect with said catching means in the path of said reciprocable member, said catching means being arranged for an engagement with and a subsequent disengagement from said reciprocable member during the operative movement of said reciprocable member in one of its directions of movement, means for guiding said reciprocable member past said catching means during the return movement of said reciprocable member in the opposite direction, and adjusting means for varying the tension of the spring acting on the braking lever.

ERIC STRASSENBURG.